United States Patent
Weiss et al.

(10) Patent No.: US 8,468,079 B2
(45) Date of Patent: *Jun. 18, 2013

(54) INDEX-BASED LIQUIDITY SYSTEM AND METHOD

(75) Inventors: Allan N. Weiss, Medfield, MA (US); Neil R. Gordon, Waltham, MA (US)

(73) Assignee: Market Shield Capital, LLC, Natick, MA (US)

( * ) Notice: Subject to any disclaimer, the term of this patent is extended or adjusted under 35 U.S.C. 154(b) by 604 days.

This patent is subject to a terminal disclaimer.

(21) Appl. No.: 12/115,287

(22) Filed: May 5, 2008

(65) Prior Publication Data

US 2008/0288418 A1 Nov. 20, 2008

Related U.S. Application Data

(63) Continuation-in-part of application No. 11/553,150, filed on Oct. 26, 2006, now Pat. No. 7,716,106, which is a continuation of application No. 10/794,465, filed on Mar. 5, 2004, now Pat. No. 7,155,468.

(60) Provisional application No. 60/915,790, filed on May 3, 2007, provisional application No. 60/915,777, filed on May 3, 2007, provisional application No. 60/453,075, filed on Mar. 7, 2003.

(51) Int. Cl.
*G06Q 40/00* (2012.01)

(52) U.S. Cl.
USPC .......................................... 705/36 R; 705/38

(58) Field of Classification Search
USPC ..................................... 705/35, 36 R, 37, 38
See application file for complete search history.

(56) References Cited

U.S. PATENT DOCUMENTS

| 4,346,442 | A | 8/1982 | Musmanno |
| 4,376,978 | A | 3/1983 | Musmanno |
| 4,597,046 | A | 6/1986 | Musmanno et al. |
| 4,674,044 | A | 6/1987 | Kalmus et al. |
| 4,700,297 | A | 10/1987 | Hagel, Sr. et al. |
| 4,774,663 | A | 9/1988 | Musmanno et al. |
| 4,953,085 | A | 8/1990 | Atkins |
| 5,083,782 | A | 1/1992 | Nilssen |
| 5,126,936 | A | 6/1992 | Champion et al. |
| 5,270,922 | A | 12/1993 | Higgins |
| 5,297,032 | A | 3/1994 | Trojan et al. |

(Continued)

FOREIGN PATENT DOCUMENTS

| JP | 2002007691 | 1/2002 |
| WO | 95/06290 | 3/1995 |
| WO | 98/13778 | 4/1998 |
| WO | 2004/013793 | 2/2004 |

OTHER PUBLICATIONS

Shiller, R. J., et al., "Home Equity Insurance", National Bureau of Economic Research, Inc., Working Paper Series, Working Paper No. 4830 (Aug. 1994).

(Continued)

*Primary Examiner* — Lalita M Hamilton
(74) *Attorney, Agent, or Firm* — Onello & Mello, LLP

(57) ABSTRACT

A system and method for creating liquidity relative to one or more small businesses or assets provides liquidity to the small business or asset holder in return for a payment stream that comprises at least one payment that is adjustable relative to at least one relevant index.

39 Claims, 4 Drawing Sheets

U.S. PATENT DOCUMENTS

| | | | |
|---|---|---|---|
| 5,671,363 | A | 9/1997 | Cristofich et al. |
| 5,745,885 | A | 4/1998 | Mottola et al. |
| 5,765,144 | A | 6/1998 | Larche et al. |
| 5,781,654 | A | 7/1998 | Carney |
| 5,802,501 | A | 9/1998 | Graff |
| 5,806,048 | A | 9/1998 | Kiron et al. |
| 5,809,484 | A | 9/1998 | Mottola |
| 5,812,988 | A | 9/1998 | Sandretto |
| 5,819,238 | A | 10/1998 | Fernholz |
| 5,826,243 | A | 10/1998 | Musmanno et al. |
| 5,890,141 | A | 3/1999 | Carney et al. |
| 5,950,175 | A | 9/1999 | Austin |
| 5,963,923 | A | 10/1999 | Garber |
| 5,987,435 | A | 11/1999 | Weiss et al. |
| 6,070,151 | A | 5/2000 | Frankel |
| 6,195,647 | B1 | 2/2001 | Martyn et al. |
| 6,249,775 | B1 | 6/2001 | Freeman et al. |
| 6,513,020 | B1 | 1/2003 | Weiss et al. |
| 2002/0082903 | A1 | 6/2002 | Yasuzawa |
| 2002/0091623 | A1 | 7/2002 | Daniels |
| 2002/0178111 | A1 | 11/2002 | Woodley |
| 2003/0083972 | A1 * | 5/2003 | Williams ............... 705/36 |
| 2003/0110111 | A1 | 6/2003 | Nalebuff et al. |
| 2003/0110122 | A1 | 6/2003 | Nalebuff et al. |
| 2004/0054613 | A1 | 3/2004 | Dokken |
| 2004/0254871 | A1 | 12/2004 | Weiss |
| 2005/0216384 | A1 | 9/2005 | Partlow et al. |

OTHER PUBLICATIONS

Shiller, R. J. "Macro Markets: Creating Institutions for Managing Society's Largest Economic Risks", Oxford University Press, Oxford (Clarendon Press 1993).

Case, K. E., et al., "Index-Based Futures and Options Markets in Real Estate", The Journal of Portfolio Management, pp. 83-92 (Winter 1993).

"The SuperTrust Trust for Capital Market Fund, Inc. Shares, et al; Notice of Application", 46 SEC-Docket 1170, Release No. IC-17613 (Jul. 25, 1990).

Kelleher, N., "The Small Business Page Cash-for-Settlement Industry; A new Idea Turns Structured Deals into Ready $$", Boston Herald, Boston, MA, Mar. 11, 1997, p. 019).

Shiller, Robert J., "The New Financial Order: Risk in the 21st Century", Princeton University Press, 2003.

Shiller, Robert J., et al., "Moral Hazard in Home Equity Conversion", Jan. 4, 1998, pp. 1-29.

Bid.Com Receives CDN$3.1 Million From Acqua Wellington Private Placement PR Newsire. New York: Jun. 20, 2000. p. 1.

* cited by examiner

INDEX-BASED LIQUIDITY SYSTEM AND METHOD

CROSS REFERENCES TO RELATED APPLICATIONS

This application claims the benefit of priority under 35 U.S.C. §119(e) from co-pending, commonly owned U.S. provisional patent application Ser. No. 60/915,790, entitled INDEX-BASED LIQUIDITY SYSTEM AND METHOD, filed May 3, 2007 and U.S. provisional patent application Ser. No. 60/915,777, entitled REAL ESTATE SMALL BUSINESS LIQUIDITY SYSTEM AND METHOD, filed May 3, 2007. This application is a continuation-in-part, commonly owned U.S. non-provisional patent application Ser. No. 11/553,150, entitled COMMON INDEX SECURITIES, filed Oct. 26, 2006, which is a continuation application of U.S. patent application Ser. No. 10/794,465, filed Mar. 5, 2004, entitled COMMON INDEX SECURITIES, now U.S. Pat. No. 7,155,468, which claimed priority under 35 U.S.C. §119 (e) to U.S. Provisional Patent Application Ser. No. 60/453,075, entitled SMALL BUSINESS LIQUID SECURITIES, filed Mar. 7, 2003.

FIELD OF INTEREST

The inventive concepts relate to systems and methods useful in the field of financial investments, and more particularly to systems and methods for facilitating investments in or by one or more entities based on at least one common index.

BACKGROUND

For any of a variety of reasons, an entity, whether, for example, an individual or corporate entity, may seek to gain liquidity in relation to a business or assets in exchange for a stake in ownership, a loan or some combination thereof. Putting aside actually selling the asset that serves as the basis for the liquidity, several conventional arrangements accommodate such an entity, or a combination of entities—in certain circumstances.

In a typical scenario involving corporate entities, some companies can achieve a degree of liquidity by offering shares in the company privately or via a public offering. In such a case, the corporate entity (i.e., the company) gets liquidity in the form of cash from the sale of shares, in exchange for giving up a part ownership of the asset. In such a case, an investment in the company comes with risks to the investor that are not only related to the industry, but also to the company itself. Such risk may stem from the potential of mismanagement of the company, loss of key employees, and so on. Individuals, or funds, may purchase shares in a variety of companies in an attempt to offset any idiosyncratic risks attributable to individual companies. But, in the end, the investors risk is still a function of the individual performance of the companies of which he owns shares.

While many companies can gain liquidity by "going public," some companies or other entities do not meet the investment community's requirements for going public. For example, in some situations, small business owners may desire to sell part of their business for diversification purposes or to raise capital to invest back into the business. This can be difficult with a small, privately held business. Capital markets are not open to the small businesses because of their small size and lack of accounting audits. So this path remains unavailable to small businesses, while being quite available to many larger businesses.

Small businesses can sometimes sell a stake, ranging from a minority stake to a 100% stake, to private investors or private equity firms, but they tend to sell at a relatively low price to earnings ratio. And, the terms of such investment can often be considered unattractive to the small business. For example, a certain amount of control of the small business may also be required in the exchange for capital from the investor. On the other hand, investors who might benefit through investments in these businesses do not have a convenient liquid way to do so. Typically, to buy into a small business an investor must go through a fairly involved and costly assessment and due diligence process. And selling the stake in the small business may also be a complicated and lengthy process.

Individuals may also have a desire for liquidity, as examples, to make investments or purchases, to pay down debt, and to fund college tuition. Typical approaches to gaining liquidity are loans, credit card purchases or cash advances. In some cases, individuals refinance or take a second mortgage on their real estate to pull cash out, or get an equity line of credit that makes liquid a portion of the equity in the real estate. These types of real estate-based liquidity approaches can carry a certain amount of risk.

With variable interest rates there is always an interest rate-based risk—i.e., the risk that the interest rate will increase during the term causing payments to increase. If the interest rate is fixed, that will not be an issue. However, with a fixed interest rate, the borrower does not get the benefit of interest rates dropping.

Aside from interest rate-based risk, there is market-based risk. With market-based risk there is a chance that the market value of the real estate will be decrease. Since real estate prices have historically been cyclical, market values will be more favorable to an owner at some points in time than it is at other points in time. In fact, since the value of the underlying real estate asset will change over time, it is possible that the real estate owner will have negative equity in the real estate at some points in time. In these cases, where the owner owes more than the real estate is worth. As a result of negative equity, refinancing options are generally unavailable and a sale of the property would require the owner/borrower to add cash to the sale proceeds to pay off the debt against the house.

Even when there is no negative equity, a market value that is lower than the owner's expectations can cause a significant financial impact. For example, if an owner presumed his house to have a market value of $1 M in three years, but sold the house three years later for 5% less, that is a $50,000 impact to that owner. Understandably, the risk of the market value of real estate going down can have a chilling effect on an owner's willingness to make liquid and use his equity. And even if the owner intended to preserve all of his equity for an eventual sale, e.g., to fund his retirement, having a lower than expected market value at the time of sale can represent an unmanageable risk. Thus, for many, the equity in their real estate is their largest asset and perhaps the intended source of cash for retirement, college tuition, and so on. A lower than expected market value can have a severe impact to such plans. This not at all addressed with conventional approaches to financing. There is no apparent way to effectively manage against market risk. This can be true for other assets, and not just real estate.

The above concerns can be equally shared in various commercial real estate contexts, perhaps more so than for an individual home owner. For example, a small commercial real estate owner, company or trust can be a holder of one or more properties, which could include typical commercial properties. As example, commercial properties could include retail space, office space, manufacturing facilities, condominiums or other properties. Holders of commercial property, whether large or small, have no apparent way to directly manage against market risk.

SUMMARY OF INVENTION

In accordance with one aspect of the present disclosure, provided is a method of creating liquidity in at least one asset, the method comprising: establishing a current market value for the at least one asset; defining an index having at least one component related to a market to which the at least one asset belongs; providing liquidity from a FUND to a holder of the at least one asset; defining a payment stream as a function of the current market value, the payment stream having one or more payments from the holder to the lender; and adjusting at least one payment in the payment stream as a function of the index. The adjustment including: if there is an increase relative to the index, adjusting the at least one payment in a first direction; and if there is a decrease relative to the index, adjusting the at least one payment in a second direction opposite the first direction.

In accordance with another aspect of the present disclosure, provided is a market-based liquidity system comprising: an asset management module configured to store data indicative of a set of assets of a holder and to store a current market value of the set of assets; an index module configured to determine an index having at least one market-based component related to a market of the set of assets; a management module configured to determine a liquidity to be provided from a lender to the holder and to define a payment stream as a function of a current market value, the payment stream having one or more payments from the holder to the lender; and a payment stream adjustment module configured to adjust at least one payment in the payment stream as a function of the index. If there is an increase relative to the index, the adjustment of the at least one payment is in a first direction. If there is a decrease relative to the index, the adjustment of the at least one payment is in a second direction opposite the first direction.

The system can further comprise a securitization module configured to define a set of shares representing claims against the set of assets. The system can further comprise an interface to an exchange system configured to trade shares from the set of shares. The set of assets can be a plurality of assets. The set of assets can include at least one real estate asset or mortgage. The index can be a predicted future market value that is determined using trend data in a relevant market.

In accordance with another aspect of the present disclosure, provided is a method for creating liquidity relative to a set of real estate assets, the method comprising: establishing a current market value of the set of real estate assets; defining an index useful for establishing a predicted future market value at a future date for the set of real estate assets, the index having at least one market-based component; providing liquidity from at least one lender to at least one holder of the set of real estate assets; defining a payment stream having one or more payments from the at least one holder to the at least one lender; determining an actual market value of the set of real estate assets at the future date; and adjusting at least one payment in the payment stream based on a comparison of the actual market value to the predicted future market value. If the actual market value is positive relative to the predicted future market value, the adjustment of the at least one payment is in a first direction. If the actual market value is negative relative to the predicted future market value, the adjustment of the at least one payment is in a second direction.

In accordance with another aspect of the present disclosure, provided is a computer program product including a set of instructions configured to be stored in at least one memory and executed by at least one processor. The instructions are configured to implement a method of creating liquidity in a set of assets. The method comprises establishing a current market value for the set of assets; defining an index having at least one market-based component; providing liquidity from a lender to a holder of the set of assets; defining a payment stream as a function of a current market value of the set of assets, the payment stream having one or more payments from the holder to the lender; and adjusting at least one payment in the payment stream as a function of the index. If there is an increase relative to the index, the adjustment of the at least one payment is in a first direction. If there is a decrease relative to the index, the adjustment of the at least one payment is in a second direction opposite the first direction.

In accordance with one aspect of the present disclosure, provided is a method of creating liquidity in at least one asset, the method comprising: identifying a set of assets of at least one holder; defining an index having at least one component related to a market to which the set of assets belong; providing liquidity from at least one lender to the at least one holder; defining a payment stream from the at least one holder to the at least one lender in exchange for the liquidity, the payment stream having one or more payments; adjusting at least one payment in the payment stream as a function of the index. If there is an increase relative to the index, the adjustment to the at least one payment is in a first direction. And if there is a decrease relative to the index, the adjustment to the at least one payment is in a second direction opposite the first direction. The method further comprises defining a fund representing the set of assets and generating a set of shares representing claims against the fund.

The set of assets can include real estate assets and mortgages. The holder can be a fund or real estate investment trust (REIT). The index can include trend data in a relevant market.

In accordance with another aspect of the invention, provided is a method comprising one or more computer implemented steps for providing liquidity in a real estate small business. The method comprises defining a fund representing a financial stake in a real estate small business; determining an initial payout by the fund to the real estate small business; defining at least one index related to real estate; defining a future payment stream to be made by the real estate small business to the fund corresponding to the initial payout; and adjusting at least one payment in the future payment stream in response to a change in the index.

The real estate can be commercial real estate, the real estate small business can be an owner of the commercial real estate, and the index can be derived, at least in part, from commercial real estate rental rates.

The commercial real estate rentals rates can be determined for a specific geographic area.

The real estate can be residential or commercial real estate, the real estate small business can be an owner of the residential or commercial real estate, and the index can be derived, at least in part, from residential or commercial real estate property values.

The residential real estate property values can be determined for a specific geographic area, type, size or class.

The index can be a composite index.

The index can be a composite index that includes one or more components not related to real estate.

The index can be a composite index that includes multiple components related to real estate.

The composite index can further include one or more components not related to real estate.

The index can be a composite index that includes one or more components comprising or derived from one or more economic indicators.

The index can be a composite index that includes one or more components comprising or derived from interest rates.

The index can include one or more components comprising or derived from earnings of the real estate owner.

The fund can further comprise at least one entity that is not a real estate small business.

The at least one entity can be a plurality of entities that are not small businesses.

The payment stream can include a set of fixed payments and at least one adjustable payment.

The payment stream can represent a set of payment obligations to be determined at predetermined times during a term of the fund, wherein the method can further comprise: determining a plurality of fixed payments to be made at one or more of the predetermined times; and, when a payment obligation and a payment obligation are determined for the same time from the predetermined times, determining a difference between the fixed payment and the payment obligation.

The method can further comprise, when the fixed payment is greater than the payment obligation, applying the difference to a principal amount owed by the small business to the fund as part of the payment stream.

The method can further comprise, when the fixed payment is greater than the payment obligation, banking the difference in an interest bearing account.

The method can further comprise, when the fixed payment is less than the payment obligation, adding the difference to a principal amount owed by the small business to the fund as part of the payment stream.

The method can include defining a fund term.

The method can include issuing shares representing claims against the fund.

The fund can be managed by a bank or other lender, or an agent or proxy therefore.

In accordance with another aspect of the invention, provided is a method comprising one or more computer implemented steps for providing liquidity to a plurality of small businesses. The method comprises: defining a fund representing a financial stake in a plurality of real estate small businesses; deriving an initial payout by the fund to each real estate small business; and defining at least one index related to real estate. The method further includes, for each real estate small business, defining the future payment stream to be made by the real estate small business to the fund corresponding to the initial payment; and adjusting at least one future payment in the future payment stream in response to a change in the index.

The real estate can be commercial real estate, the plurality of real estate small businesses can be owners of the commercial real estate, and the index can be derived, at least in part, from commercial real estate rental rates.

The commercial real estate rentals rates can be determined for one or more specific geographic areas.

The real estate can be residential real estate, the plurality of real estate small businesses can be owners of the residential real estate, and the index can be derived, at least in part, from residential real estate property values.

The residential real estate property values can be determined for a specific geographic area.

The index can be a composite index.

The index can be a composite index that includes one or more components not related to real estate.

The index can be a composite index that includes multiple components related to real estate.

The composite index can be further include one or more components not related to real estate.

The index can be a composite index that includes one or more components comprising or derived from one or more economic indicators.

The index can be a composite index that includes one or more components comprising or derived from interest rates.

The index can include one or more components comprising or derived from earnings of the real estate owner.

The fund can further comprise at least one entity that is not a real estate small business.

The at least one entity can be a plurality of entities that are not small businesses.

The payment stream can include a set of fixed payments and at least one adjustable payment.

The payment stream can represent a set of payment obligations to be determined at predetermined times during a term of the fund, the method further comprising: determining a plurality of fixed payments to be made at one or more of the predetermined times; and when a payment obligation and a payment obligation are determined for the same time from the predetermined times, determining a difference between the fixed payment and the payment obligation.

The method can further comprise, when the fixed payment is greater than the payment obligation, applying the difference to a principal amount owed by a corresponding one of the small businesses to the fund as part of the payment stream.

The method can further comprise, when the fixed payment is greater than the payment obligation, banking the difference in an interest bearing account.

The method can further comprise, when the fixed payment is less than the payment obligation, adding the difference to a principal amount owed by a corresponding one of the small businesses to the fund as part of the payment stream.

The method can include defining a fund term.

The method can include issuing shares representing claims against the fund.

The fund can be managed by a bank or other lender, or an agent or proxy therefore.

In accordance with another aspect of the invention, provided is a system for providing liquidity in one or more small businesses. The system comprises a fund creation module configured to define a fund representing a financial stake in a plurality of real estate small business in at least one class; a payout module configured to derive an initial payout by the fund to each real estate small business corresponding to a future payment stream by the real estate small business to the fund; an index module configured to define an index related to real estate; a payment module configured to define the future payment stream to be made by the real estate small business to the fund corresponding to the initial payout; and a payment adjustment module configured to adjust, for each real estate small business, at least one future payment in the future payment stream in response to a change in the index.

In accordance with another aspect of the invention, provided is a computer program stored in a computer readable medium for execution by one or more computer processors. The computer program is configured to perform a method for providing liquidity in one or more small businesses. The method comprises defining a fund representing a financial stake in a plurality of real estate small business in at least one class; deriving an initial payout by the fund to each real estate small business; and defining at least one index related to real estate. The method further includes, for each real estate small business, defining the future payment stream to be made by the small business to the fund corresponding to the initial payout; and adjusting at least one future payment in the future payment stream in response to a change in the index.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF PREFERRED EMBODIMENTS

Figure 1:
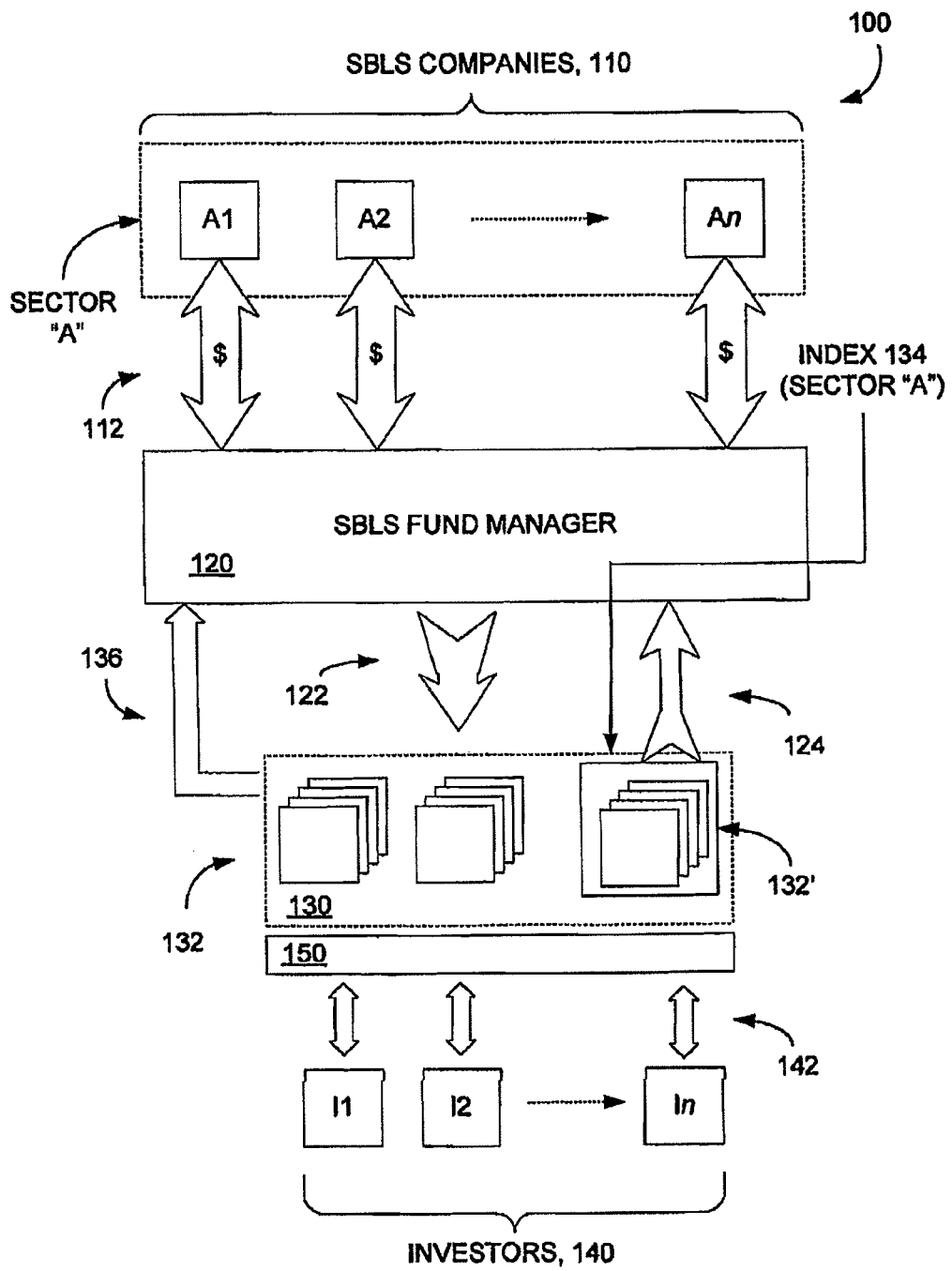
FIG. 1 is a block diagram of an embodiment of a market based liquidity system in accordance with the present invention.

Provided herein are preferred embodiments of systems and methods that implement various aspects of the present invention. While these embodiments are presently preferred, the present invention is not limited to theses embodiments. As such, the claims appended hereto should not be limited to the embodiments disclosed herein, but rather should be given the broadest possible interpretation. In the methods described herein, unless otherwise explicitly indicated, numbering or sequencing of steps does not indicate a required order or sequence of such steps.

In the below embodiments, provided are systems for and methods of providing liquidity in exchange for a payment stream that can be adjusted relative to a common index (or index) having at least a component related to a relevant asset, market, or market segment (or sector). These can be referred to as "market-based liquidity" systems and methods. In embodiments where a fund and shares are created for securitizing assets or entities that serve as the subject matter of the liquidity arrangements, such systems and methods may be referred to as "common index securities" systems and methods. In specific embodiments, such as a small business embodiment or a real estate embodiment, whether commercial or residential, names associated with such systems and methods could be representative of the context provided by the subject matter, as will be appreciated by the embodiments described herein below.

The liquidity can be provided upfront to an entity in exchange for a future payment stream by the entity. The subject matter on which the exchange is based can be one or more assets or entities (such as a "small business" as later described). As examples, the liquidity can be based on the value or performance of the assets or the entities receiving the upfront liquidity (e.g., a small business or borrower). The payment stream can comprise one or more payments that are subject to adjustment based on a value or performance relative to the common index. One or more payments within the payment stream can have at least a portion that is not subject to adjustment relative to the common index.

The relationship between the provider of the liquidity, e.g., a lender, and the entity receiving the liquidity can take the form of a promissory note, mortgage, share, unit or other contract (e.g., mortgage or line of credit), collectively referred to as a "contract." A set of assets, entities or contracts can be aggregated into a fund, a portfolio, or another entity (e.g., a trust, a small business, etc.), collectively referred to as a "fund." Shares can be created as claims against the fund, and these can be referred to as common-indexed securities. Accordingly, the value of the fund, and thus that of the fund shares, is a function of the common index. The fund shares could be offered publicly, privately or some combination thereof, or not at all, and could be offered in different classes.

SBLS

In a first preferred embodiment, a common index securities system and method is implemented as a small business liquid security (SBLS) system and method that enables investment in one or more "small businesses," as entities, relatively easily. An SBLS system in accordance with this embodiment enables the creation, issuance, trading and management of SBLS shares based on those businesses as an ordinary liquid equity investment tradable on a stock exchange, like shares of any publicly traded company. Since an SBLS fund is a form of a common index fund, the value contributed by each small business (and any other entity represented in the fund) can be indexed to, for example, a common industry-wide performance index, rather than each entity's individual performance. SBLS shares may be traded publicly, privately or some combination thereof, or not at all.

The small businesses that participate in the fund can be of any size, so a combination of sizes of businesses may be represented. In the SBLS embodiment, a "small business" can be a business defined by certain agencies or governmental regulations as a "small business" based on criteria relating to the size of the business, such as its number of employees, gross revenue, and so on. The phrase "small business" as used herein is also meant to comprise businesses or entities not traded or traditionally tradable as a liquid security, such as: (1) any entity which is generally considered by the financial community as not suitable for an initial public offering (IPO) or public trading, (2) any entity which was once publicly traded, but has since been de-listed, (3) a subsidiary or affiliate of a business, even if that business is traded publicly or privately, (4) any other entity not publicly traded, regardless of size, or profitability, (5) one or more individuals or entities having a source of income, (6) a partnership or joint venture, (7) a university or not-for-profit organization, (8) a trust, (9) a company that is already publicly traded, or (10) any combination of the foregoing. As examples, a start-up company, an educational institution, a not for profit or charitable institution, or individual or group of individuals may each be a "small business" within the context of the present invention. A fund in accordance with the present invention may represent any of the foregoing, along with businesses having stock that is publicly traded, or tradable.

The SBLS fund can represent entities from one or more defined classes. The classes could be industry based, such as a defined class for oil companies, as just one example. As another example, a class may represent a certain sector, or limited number of sectors, of an industry. And changes in an index associated with the fund could represent, in whole or in part, performance or earnings associated with that industry sector or sectors.

FIG. 1 shows a block diagram of a representative common index securities system in accordance with the present invention. In this embodiment, the common index securities system is an SBLS system 100—meaning at least one entity represented by the fund is a small business, as that phrase is used herein. It will also be appreciated by those skilled in the computer arts and investment arts, that the present invention is not limited to the explicit structure of FIG. 1.

An SBLS fund 130 may specialize in a particular industry sector or sub-sector (collectively "Sector"), shown as Sector A in FIG. 1, as a predefined class. The Sector may be narrowed by having a sub-sector focus, such as a geographic focus based on a country, region, or several countries. The SBLS fund 130 may be created and managed, as shown by arrow 122, by a fund manager 120 (or fund management system), which issues shares 132 against the SBLS fund 130. Shares 132 may be offered publicly, e.g., on an exchange 150, offered privately, or not offered at all. That is, the shares 132 need not ever be offered for trade or listed on an exchange.

The SBLS fund manager 120 forms relationships with many small businesses 110 (e.g., businesses A1, A2, ... An) in at least one class or sector of interest, e.g. Sector A, to form SBLS fund 130. The SBLS fund manager 120 could reach individual business owners through alliances with commercial banks, brokerage firms, leasing companies, franchise companies or other sources of commercial loans, business brokers, or real estate brokers. Such distribution, networking and solicitation may be accomplished electronically via the illustrative computer architecture 300 shown in FIG. 3, by more traditional means or by some combination thereof.

The SBLS fund manager 120 can serve as the source or coordinator of the upfront liquidity provided to each small business in the form of cash, marketable or non-marketable securities, or both, as indicated by arrow 112. Non-marketable securities can be securities that are not publicly tradable, e.g., SBLS securities before they have gone public. Additionally, or alternatively, one or more small businesses could receive shares in the SBLS fund, which may later become liquid and/or begin paying distributions. Such small businesses 110 could receive SBLS shares 132, whether marketable or not, received by the fund manager 120 via arrow 136. The fund manager 120 may also obtain shares 132' for itself, as indicated by arrow 124. The subset of shares 132' can be determined by allocating a number of shares to a small business (e.g., A1) based on a buy-in of each small business and then applying left over amounts from the buy-in to purchase shares 132' for the fund manager 120. The buy-in is the financial commitment or stake in the small business provided to the fund in exchange for the upfront liquidity.

In return for the upfront liquidity provided by the SBLS fund 130 to the small businesses 110 via arrow 112, the SBLS fund 130 receives one or more subsequent payments from the small businesses 110. The subsequent payments take the form of a payment stream from each business to the fund manager 120 (and therefore SBLS fund 130), also indicated by arrows 112. The payment stream owed by each small business is subject to adjustment based on performance by the small business relative to an index 134. As discussed above, the index 134 can correspond to or represent an industry, or industry sector, a market or market segment, any of which may be related to a defined class to which the small business belongs. As such, index 134 represents an indication of the performance of the relevant market.

In the preferred form, the payment stream owed by a small business, e.g., A1, is adjustable based on the performance of that small business relative to the index 134. So, the payment stream of a small business could decline if that small business performed better than the index 134 and could increase if the small business performed worse than the index 134. Since the performance of each small business can be individually evaluated relative to the index 134, each small business can have its payment stream adjusted differently. In certain circumstances, e.g., if the performance of a small business is substantially unchanged, but there are changes in the index 134, the payment stream of the small business can decrease in negative economic circumstances and rise in positive economic circumstances—presuming that the index 134 declined in negative circumstance and had risen in positive economic circumstances. But there can be embodiments where a reciprocal relationship is implemented for some or all of the small businesses. In some embodiments a lower cap, an upper cap or both could be applied to the payment stream.

Since the small businesses 110 can receive shares 132 of the SBLS fund 130, a business A1 can also be an investor, e.g., investor I1. If the SBLS shares 132 are traded, then others can also invest. Regardless, SBLS fund investors 140 (e.g., investors I1, I2, ... In) receive earnings that can change in proportion to changes in the index 134 or some formula which takes the index as an input (could also be leveraged e.g. 2× the index change), because each entity's payments are tied to the index 134. As mentioned above, index 134 may be an index for the overall industry sector or sectors to which the small businesses 110 belong. Because the fund's performance is indexed to the industry, rather than the individual businesses' performance, the investors are not exposed to individual business mismanagement, fraud or other idiosyncratic risk, aside from default, partial default, or bankruptcy, of individual businesses in the SBLS fund 130. Accordingly, the value of the fund, and that of the fund's shares, and any dividends paid out, are not relative to any individual business' earnings, revenues, expenses, cash flow or other performance or condition measure. To mitigate the risk of default, partial default or bankruptcy, for example, a guarantor (not shown) may be included in the system of FIG. 1 (or FIG. 2) to back-up the obligations of one or more of the participating small businesses 110.

In this embodiment, the small businesses can "go public" with a portion of its shares and receive close to a publicly traded level of price to earnings (PE) ratios, while the party that issues the SBLS shares 132 can also realize a profit from the remaining portion of the arbitrage between private business PE ratios and those for publicly traded companies, as explained in greater detail below. Even when there are not small businesses represented by the fund, the same benefits are available to other types of entities and may be preferred to going public—even if going public were available to an entity. Of course, an entity could be publicly traded, and also be represented in a common index securities fund.

The value of the fund, and thus the value of the fund shares, is based on the payments made to the fund by those businesses represented in the fund, which is a function of the index. The index 134 may be a published index for the industry sector, if such an index exists, or it could be an index derived from one or more of other relevant data or information, for example: (1) the performance of a set of companies that is representative of the businesses in the fund or an industry associated with the fund, (2) one or more composite indices, (3) performance information related to small businesses within the fund (e.g., earnings, debt) or the sector or sectors, or (4) generally available economic or financial indicators or rates (e.g., prime interest rate, unemployment, commodity prices, or cost of living). In short, there is no particular constraint placed on the one or more indices used, other than they provide some meaningful relationship to the fund or businesses represented by the fund. Among other things, the index or indices used may be geographically, regionally, politically or nationally oriented.

As will happen from time-to-time, a business, e.g., business A2, may be acquired. In such a case, and if the fund is structured to permit it, the rights and obligations of the acquired business A2 can transfer to the new owner of the business A2. In various embodiments, A2 (and its new owner)

could be released from the fund if it resolves its payment stream obligations. It could also sell back its shares, or continue to hold them. Such provisions are preferably established at fund formation. Otherwise, such an acquisition could force a mandatory elimination or buy-out of A2 from the SBLS fund, which could carry a penalty. During the term a business may wish to pull-out of the fund for other reasons (e.g., to go public on its own). A similar buy-out may be allowed in such cases.

Some benefits of a single industry SBLS fund 130 approach shown in FIG. 1 can include:

1) Each SBLS fund 130 can specialize in one industry sector or sub-sector so investors and analysts can understand and choose investments they like.
2) The SBLS fund 130 takes only industry risk, not idiosyncratic business risk of any individual business in the fund (except, potentially, default, partial default or bankruptcy risk).
3) There are no fraud or management accountability issues regarding the individual businesses in the SBLS fund 130 or, at the very least, they are diluted enough to make them smaller factors relative to investing in one business.
4) The individual business owner diversifies away some of his business risk.
5) The individual business owner retains the incentive to run his business for maximum profit because he keeps the entire amount that his profit growth exceeds that of the index.
6) The obligations of the individual business to pay an amount indexed to the performance of it its industry should be acceptable because the small business owner would presume that such obligation will track the individual businesses performance to a large degree.

Figure 2:
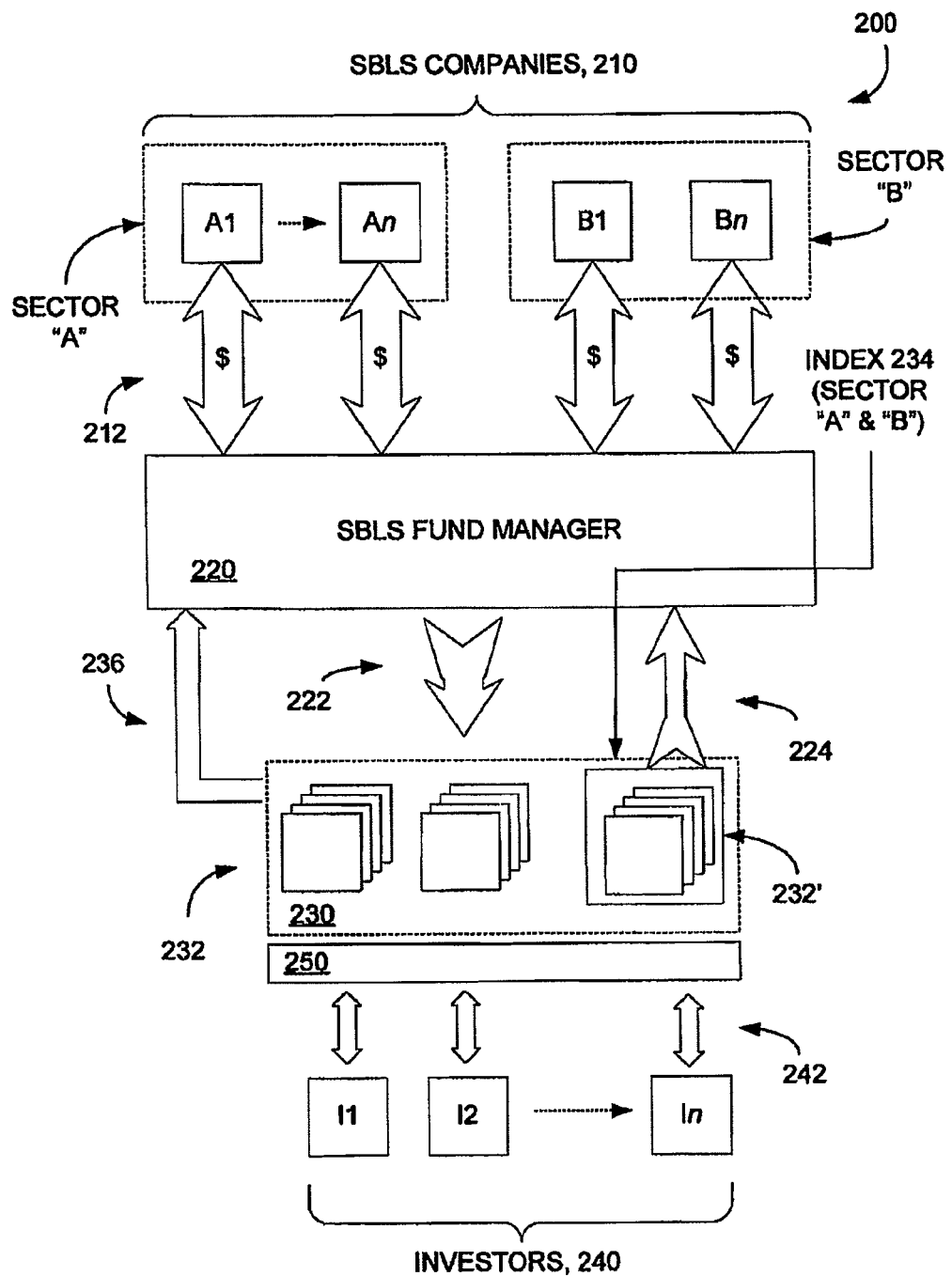
FIG. 2 is a block diagram of an alternate embodiment of a market based liquidity system, in accordance with the present invention.

In some forms, more than one industry or class may be represented in a SBLS fund, as is shown in FIG. 2. As an example, an SBLS fund 230 could represent two industry sectors A and B having significantly different volatility. In such a case, the SBLS fund 230 would not only be a composite of several small businesses 210, but also of a plurality of sectors or classes, offering to investors 240 a risk/reward opportunity that is a hybrid of the two. The risk/reward could be weighted according to the representation of each sector in the SBLS fund 230. For some investors, this hybrid SBLS fund 230 could provide a more attractive risk/reward opportunity than any one industry represented in the SBLS fund could offer by itself. In some forms, two different markets or market sectors represented in the fund could be used as an internally self-hedging mechanism.

Otherwise, the SBLS fund 230 functions are similar to those of the SBLS fund 130 of FIG. 1. That is, SBLS shares 232 are issued against the SBLS fund 230 and managed by the SBLS fund manager 220 (or management system). Because the payments made by the small businesses in the fund are tied to an index, the value the fund and the SBLS shares 232, and thus any related payouts to investor share holders 240, can fluctuate in response to index 234. Index 234 may comprise one or more indices derived from or related to Sectors A and B. The payouts to investors could also be made as a function of a blend of the index 234 and profits of the businesses, or other applicable or predetermined revenue sources or parameters.

The small businesses 210 from these sectors buy-in and receive upfront liquid assets, such as cash, marketable securities or both, indicated by arrows 212. The businesses could receive SBLS shares 232 via fund manager 220, also indicated by arrow 212, which need not necessarily be liquid. The fund manager 220 may obtain these SBLS shares 232 from the SBLS fund 230 as indicated by arrow 236. In exchange for the upfront liquidity or other assets, the small businesses 210 agree to make one or more subsequent payments to the fund, e.g., regular payments based on earnings—as a payment stream. The amount of at least one of the payments is preferably adjusted according to index 234, which may be any type of index described herein.

The index 234 should have a relationship to the businesses represented in the fund, e.g., the relevant industry, market, or market segment(s). Therefore, a rise in the index for the industry or industries, or relevant sectors, can cause a corresponding rise in the payments to be made by the small businesses 210, based on performance relative to the changing index. A corresponding arrangement for payments to decrease in response to a lower than expected index could also be accommodated. In any event, a rise in the payments by one or more of the small businesses can causes a corresponding rise in the value of the fund, and thus the fund's shares.

The fund manager 220 may also receive a subset of SBLS shares 232', indicated by arrow 224. The subset of shares 232' can be determined by allocating a number of shares to a company (e.g., company B1) based on that company's buy-in and then applying left over amounts from the buy-in to purchase shares 232' for the fund manager 220. The SBLS fund's investors 240 purchase shares 232 from the fund 230, e.g., publicly through an exchange 250 or privately. Again, some or all of these investors 240 may be the small businesses 210 represented in the SBLS fund 230. The value of the fund, thus the values of the fund shares, is based on the payments made to the fund, along with other market factors, which are based on or related to the index 234. In lieu of, or in addition to, receiving shares 232', the fund manager may receive compensation in other forms, e.g., a portion of the payments made by small businesses 210, a transaction fee associated with the trading of shares, or both.

Exemplary Structure of Arrangement Between a Business and SBLS Fund

This example demonstrates the single sector SBLS fund, but those skilled in the art can easily extrapolate from this example to functioning in a multi-sector SBLS fund. Among the benefits to the businesses are up-front liquidity, as mentioned. Another benefit of the underlying structure of the relationship between the businesses and the SBLS fund 130 is to allow the SBLS fund 130 to share in the financial performance of the business Sector A through payments by individual businesses 110 in the chosen sector and enable fair and attractive tax treatment between the two entities, i.e., SBLS fund 130 and the small businesses 110 in the fund. In the hybrid or multi-sector SBLS fund, these benefits may be applied to several sectors represented within a single hybrid SBLS fund.

To accomplish these goals, the structure may be debt with some equity-like aspects or it could be all equity. One exemplary structure is:

| | |
|---|---|
| Proportion of Business: | up to 20% |
| Basic Structure: | Equity |
| Payments: | Quarterly payments, adjusted based on performance relative to index |

Form of Liquidity to Business Owners: Cash, or stock in the SBLS fund 130

Criteria for Accepting Businesses into the SBLS Fund 130 may include, as examples:
1) Verification of correct industry sector
2) Existence of bank loans, or other debt
3) Credit history or worthiness
4) Existence and aging of receivables
5) Personnel issues
6) Availability of collateral
7) Availability of personal guarantees
8) Investor, partner, or other business relationships effecting likelihood of success of business As an example, a new SBLS fund 130 may be formed of small businesses 110 that are in the business of delivering home heating oil. Therefore, Sector A represents the home heating oil delivery sector. Individual small businesses will be approached by commercial banks who make an introduction to the fund managers with whom they do business. The small businesses are screened and the selected small businesses 110 are offered the opportunity to receive SBLS fund shares 132 in return for paying in up to 20% of their current profits, indexed to a home heating oil delivery company earnings index 134.

For example, if a particular company A1 earns $1 million per year, it could begin by committing to pay in $200,000 per year, see arrow 112. A buy-in ratio is initially set by the fund creator/manager 120 to 15, so A1's payment is deemed to be worth $3 million in shares at market value. In this example, each share 132 in the SBLS fund 130 is initially set to earn $1 per year and the expected trading price of the shares is $20, because the PE is expected to be 20. The PE ratio (e.g., 20), earning per share (e.g., $1), and buy-in ratio (e.g., 15) are all determined initially. As with other securities, the PE ratio and earnings per share are subject to ongoing change. Additionally, it is not necessary that all shares are issued to a company at buy-in; the number of shares could be allowed to float with the performance of the SBLS fund 120.

The earnings per share is a relatively arbitrary figure that need not have any relationship to the sector. Although, the PE ratio may be based on historical performance of the given sector, e.g., a PE of 20 may be about the average for small businesses in the sector. The buy-in ratio is set by the SBLS fund manager 120 to provide an attractive opportunity to the businesses, while also making the opportunity attractive for the SBLS fund manager 120.

In this exemplary scenario, therefore, the company A1 would receive 150,000 shares, e.g., $3M/$20 per share. This follows the general equation:

(PAYMEMT×BI RATIO)/PE=#SHARES TO COMPANY ($200 k×15)/20=150 k shares

However, the $200,000 buy-in paid by company A1 enables the creation of a total of 200,000 shares total, each with earning initially set at $1. Therefore, there are an additional 50,000 shares, determined by the equation:

(PAYMENT/SHARE EARNING)−#SHARES TO COMPANY=#SHARES TO FUND MGR [$200 K/($1/share)]−150,000 shares=50 k shares These 50,000 shares (or a portion of them) can be used as compensation to the fund manager 120 as shares 132', indicated by arrow 124.

Variations on the above approach may also be accommodated. Myriad variations possible include adjusting any of the structure parameters used in the example above, as would be appreciated by those skilled in the investment or financial arts. For example, some possible variations include:

1) The index 134 can be made a function of the revenues of a set of businesses or on business profits within a certain geographic region.
2) The payment by the businesses to the SBLS fund 120 could vary by each business's revenues or some kind of standardized profits paradigm. For example, the formula could increase buy-in payments to the SBLS fund by businesses over time to increase fund value.
3) The businesses need not be concentrated solely in one industry, but could additionally or alternatively be chosen or classified by geographic region or size or some other classification within the industry.
4) Represent in the SBLS fund not just businesses, but other types of entities, such as professional practices or even individual incomes and then make the index a function of the profession e.g. dentists, baseball players, musicians, actors, CEOs.
5) As mentioned above, as a form of hybrid SBLS fund, a diverse set of businesses may be grouped to form a more balanced fund, potentially reducing industry related risk.
6) The index 134 could be any type relevant index, composite index (e.g., S&P 500, Dow Jones Industrial Average, Nikkei) or combination of indices or other economic parameters or indicators (e.g., interest rates, CPI).
7) Interest payments and/or dividend payments could be made based on periodic criteria, event driven criteria (or stimuli), including threshold criteria, or some combination thereof.
8) The SBLS fund could represent, at least in part, bundles of receivables (e.g., present, future or a combination thereof), contract proceeds, or marketable rights (e.g., present, future or a combination thereof).

An example of adjusted criteria is as follows:

| | |
|---|---|
| Proportion of Business: | up to 20% |
| Basic Structure: | Equity |
| Payments: | Quarterly payments, adjusted based on performance relative to index for market sector in geographic region |

Asset-Based Embodiments

A market-based liquidity system and method can be implemented to gain liquidity or protect against a decrease in market values in one or more valuable assets. The types of assets are not inherently limited. For example, they could include an entity's inventories, collectibles, stocks, bonds or other securities, commercial equipment, livestock, vehicles, (e.g., boats, planes, automobiles), commodities, investment properties, residential properties, commercial real estate or other real estate. In various embodiments, the fund can be managed by a bank, investor, or other party or entity, or an agent or proxy therefore (collectively referred to herein as a "bank").

The upfront liquidity could be used to purchase, refinance, or to take equity out of one or more assets. In such cases, the entity that gains the upfront liquidity could be an owner, buyer, licensee, licensor, lessor, lessee (each of which can be referred or as a "holder") of the asset and a lender (or other financial source) could provide the upfront liquidity in the form of a loan or other form of financing.

In a real estate context, the holder can be any form of entity, including a small business as described herein. As specific examples, the holder could be an individual home owner, a small commercial real estate owner, a corporate entity, or a real estate investment trust (REIT). The lender and fund manager are roles that can be performed by one or more parties. The lender provides the upfront liquidity and can be compensated via the payment stream. The fund manager can establish and manage the fund and securities or shares can be created, issued, and redeemed. The fund manager, the lender or both can be compensated in shares (if any), from the payment stream or from fees, or a combination thereof. Below are real estate embodiments of a market-based liquidity system and method, but other embodiments are also possible.

Real Estate Embodiment #1

According to this embodiment, a holder is given upfront liquidity based on at least one residential or commercial real estate asset. In return, the holder commits to a payment stream, at least a portion of which is adjustable relative to an index. The payment stream comprises one or more payments that are made at some point subsequent to receiving the upfront liquidity. For example, a term can be established and payments can be due periodically within the term, or a lump sum payment can be due at the end of the term, or a combination of the foregoing can be used.

The index includes at least a portion that is market based, i.e., at least a portion of the index is a relevant economic or financial measure of the market to which the real estate asset belongs. The financial relationship and obligations can be provided in a contract, mortgage or the like.

In a general embodiment, the structure can include the following elements:
A. ASSET is identified;
B. INDEX defined or determined;
C. FUND gives upfront liquidity to HOLDER and HOLDER commits to make payment(s) to FUND in the form of a PAYMENT STREAM;
D. PAYMENT STREAM, or portion thereof, adjusted based on the INDEX.

The INDEX can be defined in any of a number of manners, and can be a measure or indicator of the relevant or local market. For example, the INDEX can be a measure of property values in a state, region, county, city or town, group of towns or cities, development or complex, neighborhood, or street. The INDEX can be at the town level, but many towns can be included in a fund (with one or more than one mortgage per town or property).

The INDEX can be a number or value against which changes are determined and the PAYMENT STREAM adjusted accordingly. For example, the INDEX could be the average price of a single family home in a region. If that INDEX changed, i.e., the average price of a single family home increased or decreased, then the PAYMENT STREAM can be adjusted. Thus, in such an embodiment, any positive or negative change in the INDEX can result in an adjusted payment from the HOLDER to the FUND.

In other embodiments, the INDEX can be defined by a function or formula. As an example, changes in the INDEX could be determined relative to a predetermined value or parameter, such as a percentage (e.g., 5% per year). That is, a market level change at the end of the term can be assessed relative to the percentage to determine if the market appreciated more or less than 5% during a term. As a function or formula, the INDEX can take information and data related to the ASSET and the relevant market as inputs, e.g., market values, values of related or representative indices, or economic indicators. In some embodiments, a predicted future market value of the ASSET or the market could be a value against which changes in the INDEX are determined.

In some embodiments, the INDEX starting point could be adjusted by an amount or percent to provide an early termination penalty or disincentive to the HOLDER that would ensure payment to the FUND. For example, if the INDEX were the average market value of the ASSETS (or like assets), then that value could be discounted initially by 5%, as an example. In such a case, early termination by the HOLDER would result in a payment even if there was no real change in or relative to the INDEX.

A specific embodiment of the above structure can be as shown in the example below.

Example 1 a. HOLDER=individual home owner
b. ASSET=single family home (SFH) in Lexington, Mass.
c. CURRENT MARKET VALUE=$1 M
d. FUND=mortgage company
e. INDEX=average SFH price in Boston Area
f. TERM=3 years
g. PAYMENT STREAM=principal & interest monthly, lump sum at term end with adjustment based on INDEX Using a SFH index, if the INDEX goes down, the FUND owes the HOLDER, but if the INDEX goes up the HOLDER owes the FUND.

Presume that the average SFH price in the Boston metro area is $300 K at contract formation, or at such other time that the INDEX is established. If the average SFH price increased by 10% over the TERM, then the PAYMENT STREAM would be adjusted relative to the increase. Presumably, the value of the ASSET increased by 10%, in this case by $100 k. Thus, if the FUND was to receive all of the increase, then $100 K would go to the FUND.

In some embodiments the FUND could get a percentage of the increase and the HOLDER could receive some or all of the remainder. For example, the contract could be structured such that the FUND gets 80% of the increase and the HOLDER gets 20% of the increase.

Real Estate Embodiment #2

The structure above can be amended to include trend information, as another embodiment, as follows:
A. ASSET is defined and CURRENT MARKET VALUE determined;
B. TREND in market values determined for the ASSET;
C. INDEX defined or determined; can be the PREDICTED FUTURE VALUE(S), which is related to and can be determined from the TREND;
D. FUND gives upfront liquidity to HOLDER and HOLDER commits to make payment(s) to FUND in the form of a PAYMENT STREAM;
E. PAYMENT STREAM, or portion thereof, adjusted relative to the INDEX.

The TREND can be determined in any of a variety of ways by applying known prediction models and algorithms: (1) based on historical data; (2) based on future data; or (3) a combination of (1) and (2). The TREND can be a fixed number or it can be a curve determined by such predictive modeling. When using future data, the contract could stipulate that trend data would be collected up to some point after contract execution. As an example, the contract could stipulate that trend data would be collected from three months before contract execution through three months after contract execution.

In embodiments using a TREND, the INDEX could be a PREDICTED FUTURE VALUE determined at the end of or at other times during the TERM using the TREND and possibly other data. As a result, the INDEX value can vary over the TERM based, at least in part, on the TREND. In such a case, the PREDICTED FUTURE VALUE can be of the market or specific ASSETS.

Performance relative to the INDEX can be determined in different ways. For example, an ACTUAL MARKET VALUE can be compared to the INDEX and the difference, whether positive or negative, can be used to adjust the PAYMENTS STREAM. Like the PREDICTED FUTURE VALUE, the ACTUAL MARKET VALUE can be of the market or of specific ASSETS. For example, the ACTUAL MARKET VALUE could represent the average price of comparable ASSETS in the relevant market. Or the ACTUAL MARKET VALUE could be an appraised value of the specific ASSET.

In such a case, at the end of the TERM an ACTUAL MARKET VALUE can be assessed relative to the INDEX to determine if there was an increase or decrease relative to the INDEX.

A specific implementation of the above structure can be as shown in the following example.

Example 2 a. HOLDER=individual home owner
b. ASSET=SFH in Lexington, Mass.
c. CURRENT MARKET VALUE=$1 M
d. FUND=mortgage company
e. TREND=−5% per year (in relevant market)
f. INDEX=PREDICTED FUTURE VALUE forecasted by applying the TREND and CPI (Consumer Price Index) to the CURRENT MARKET VALUE
g. TERM=6 years
h. PAYMENT STREAM=principal & interest monthly, lump sum at term end with adjustment relative to INDEX (PREDICTED FUTURE VALUE)

In other embodiments, other economic indicators could be used, or no economic indicators could be used. The TREND is determined based on historical data and future data. For example, if the contract is executed in June of 2006, the contract could stipulate that a trend data window for finally determining the TREND begins on Apr. 1, 2006 and closes on Sep. 30, 2006.

PREDICTED FUTURE VALUE(S) can be forecasted at one or more points in time and used as the INDEX against which the PAYMENT STREAM is adjusted. In this embodiment, a PREDICTED FUTURE VALUE is determined as a weighted function of the TREND and the CPI in each year. According to this example, the PREDICTED FUTURE VALUES are determined for each of years 1-6 as follows:

Year 1: 100% of TREND, 0% CPI (CPI=N/A)
  i. $1 M×0.95=$950,000
    1. PREDICTED FUTURE VALUE (1)=$950,000
Year 2: 80% of TREND; 20% CPI (CPI=4.2%)
  ii. $950,000×0.80×0.95=$722,000
  iii. $950,000×0.20×1.042=$197,980
    1. PREDICTED FUTURE VALUE (2)=$919,980=$722,000+$197,980
Year 3: 60% of TREND; 40% CPI (CPI=4.0%)
  iv. $919,980×0.60×0.95=$524,389
  v. $919,980×0.40×1.04=$382,712
    1. PREDICTED FUTURE VALUE (3)=$907,101=$524,389+$382,712
Year 4: 40% of TREND; 60% CPI (CPI=4.2%)
  vi. $907,101×0.40×0.95=$344,698
  vii. $907,101×0.60×1.042=$567,120
    1. PREDICTED FUTURE VALUE (4)=$911,818=$344,698+$567,120
Year 5: 20% of TREND; 80% CPI (CPI=3.5%)
  viii. $911,818×0.20×0.95=$173,245
  ix. $911,818×80×1.035=$754,985
    1. PREDICTED FUTURE VALUE (5)=$928,230=$173,245+$754,985
Year 6: 0% of TREND; 100% CPI (CPI=3.9%)
  x. $928,230×1.039=$964,431
    1. PREDICTED FUTURE VALUE (6)=$964,431

The adjustments to the PAYMENT STREAM are determined relative the INDEX, which takes the form of the above PREDICTED FUTURE VALUES. According to this embodiment, if the TERM is 6 years, then an ACTUAL MARKET VALUE (or market level) is determined at the end of the TERM and compared to PREDICTED FUTURE VALUE (6) above. The adjustment rules can be as follows:

a. If the ACTUAL MARKET VALUE=PREDICTED FUTURE VALUE (6), then no payment adjustment
b. If the ACTUAL MARKET VALUE<PREDICTED FUTURE VALUE (6), then FUND pays at least a portion of the difference to HOLDER
c. If the ACTUAL MARKET VALUE>PREDICTED FUTURE VALUE (6), then HOLDER pays at least a portion of the difference to FUND.

Continuing with the above example using ASSET specific values, the adjustment relative to the INDEX can be as follows:

a. If ACTUAL MARKET VALUE=$950,000, then FUND pays HOLDER $14,431 (or a portion thereof); but
b. if ACTUAL MARKET VALUE=$975,000, then HOLDER pays FUND $10,569 (or a portion thereof).

As an alternative, in the above example the adjustment can be determined using market related values. At year 6 the PREDICTED FUTURE VALUE=0.964 (i.e., $964,431/$1 M). This means that the INDEX at year 6=−3.6%. The ACTUAL MARKET VALUE can be the average price of single family homes in year 6. The payment adjustment could, therefore, be determined as follows:

a. If ACTUAL MARKET VALUE=−5%, then FUND pays HOLDER; but
b. If ACTUAL MARKET VALUE=+3%, then HOLDER pays FUND.

The above embodiments demonstrate how the HOLDER (e.g., home owner) can be protected against unacceptable drops in the value of the property. For those looking to sell the property in the near term (e.g., within the next 6 years or less), this can offer significant risk reduction.

In various embodiments, if the HOLDER has chosen not to sell at the end of the term, then the HOLDER could be compelled or given the choice to make a lump sum payment to the lender if the HOLDER owes the lender according to the payment stream adjustment formula. The principal due under the contract could be increased to provide payment to the lender and the contract could convert to a traditional mortgage going forward with the lender. If the lender owed money to the HOLDER, but the HOLDER did not want to sell or refinance, then the lender could reduce the principal due under the contract or could make a lump sum payment to the HOLDER. Under this scenario the contract could also be converted to a traditional mortgage.

In various embodiments, if the HOLDER chooses to terminate the contract early, additional payment(s) could be assessed against the HOLDER. For example, the lender may be relieved of its obligation to pay the HOLDER payment stream adjustments, if owed. If payment is due from the HOLDER to the lender, then the HOLDER could be compelled to pay some or all of that payment to the lender. Additionally, or alternatively, the HOLDER could be required to pay an early termination fee, e.g., a percentage of the original loan amount, existing balance, or present value of at least a portion of future payments—according to a formula defining future payments using the index and, possibly, other factors.

Real Estate Embodiment #3

In other embodiments there can be multiple contracts, multiple assets, multiple assets under the same contract, or a combination thereof. In such cases, the contract or contracts can be held in a portfolio or fund. The portfolio or fund could be held by a REIT, a corporate entity, a small business (as defined above) or other entity. In such cases, securities or shares can be issued as claims against the fund. A fund manager could manage the fund, including the issuance and redemption of shares.

In such a case, the following elements could be added to the structure of Real Estate Embodiment #1 or #2:
1. ASSETS aggregated in a PORTFOLIO/FUND/REIT/CORPORATE ENTITY; and
2. SHARES issued against PORTFOLIO/FUND/REIT/CORPORATE ENTITY.

In this embodiment, the assets (or the contracts) could be represented in a fund. Or assets could be aggregated in one or more entities, such as a small business, trust or other entity, and the entity or entities could be represented by the fund. Shares could be issued and traded on an exchange. For example, FIG. 1 can be adapted as shown in FIG. 4 for this real estate embodiment.

Figure 4:
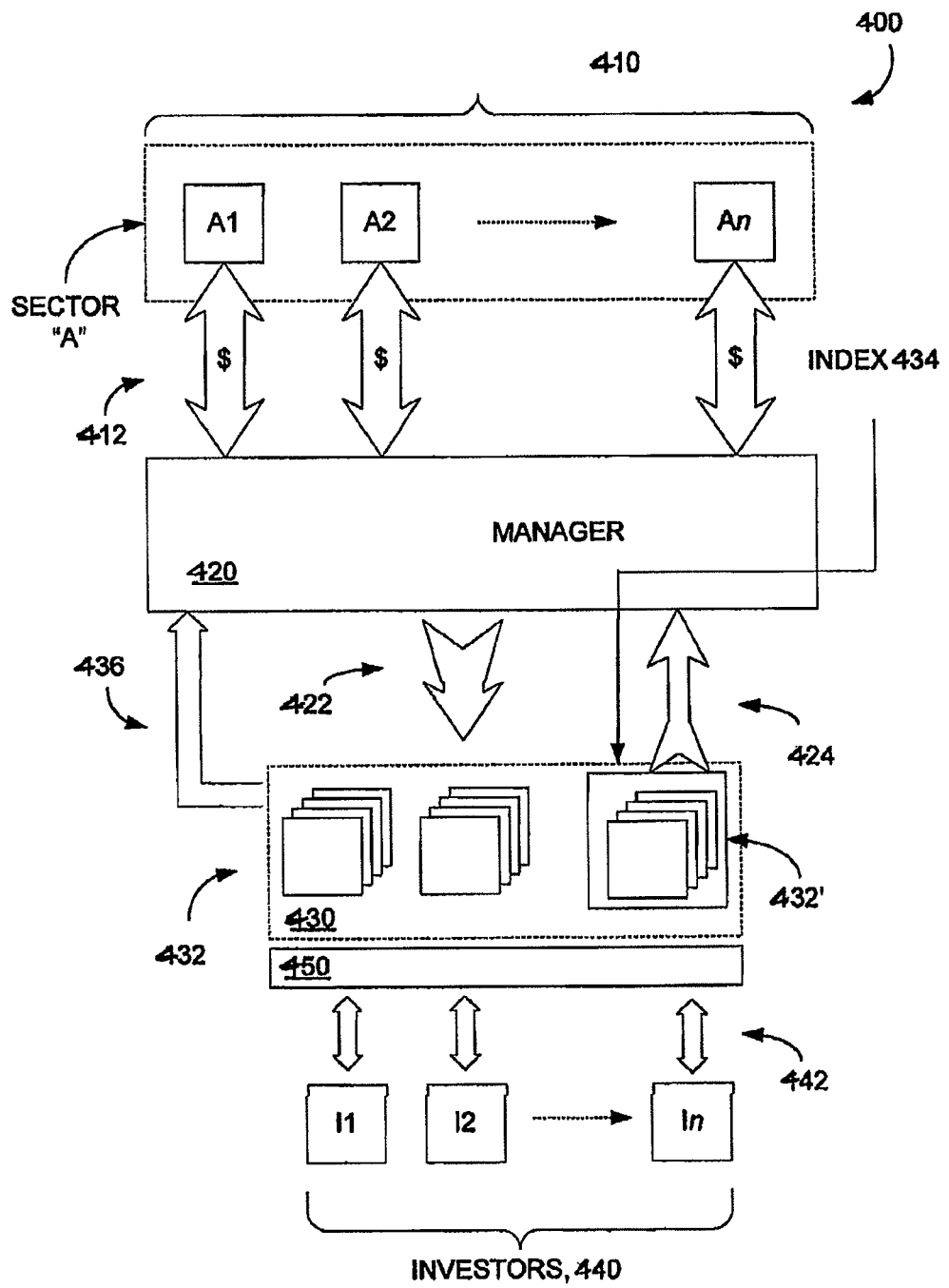
FIG. 4 is a block diagram of another embodiment of a market based liquidity system in accordance with the present invention.

FIG. 4 is a block diagram of an embodiment of a common index securities system implementing the above real estate embodiment. In FIG. 4 assets A1, A2 . . . An are held by at least one REIT 410 (collectively referred to as REIT 410) in a given market (or sector) "A." Sector "A" could be a geographic area, as an example. Manager 420 can be one or more lenders, a fund manager, or both.

Arrows 412, therefore, can represent the upfront liquidity provided by manager 420 to REIT 410 relative to each of assets A1, A2 . . . An. The upfront liquidity can be a first or a second mortgage (or equity line of credit) related to one or more of the assets. Arrows 412 can also represent a payment stream or streams back to the manager 420. Each payment stream includes at least one payment, at least a portion of which is adjusted based on at least one index 434.

Index 434 includes at least one component that is market based, e.g., market-based trend data. It could include other components that are not strictly market based. For example, a market-based portion of the index 434 could represent or be derived from housing prices in a specific geographic area. This information could be used to determine a trend for real estate in that market. A portion that is not market based could be an economic indicator or an interest rate—CPI is one example of an economic indicator.

In Real Estate Embodiment #1, the index was the average price of single family homes in a relevant geographic are. Any change in the index relative to the initial value of the index resulted in a payment stream adjustment. This approach could be used in this embodiment.

In Real Estate Embodiment #2, the index was determined as one or more forecasted future values, as determined using trend data and (optionally) CPI data. Payment stream adjustments were made relative to the index. In that example, the formula used to forecast future values is applied to trend data to determine a predicted future market value. That approach could be used in this embodiment.

Other formulas can be used and the weighting within a formula can differ. For example, weighting can depend on the part of the market cycle within which the contract is formed. For example, a downward trending real estate market will only last for so long, before the market turns up again. Using recent data to establish a trend can be useful in the near term, but usefulness can diminish with the passage of time in a cyclical market. At some point a parameter, like CPI, may become increasingly indicative of the market trend, as the market recovers and stabilizes for the remainder of the contract term. These considerations can be equally applicable in an upward trending market. Thus the index and formula will differ, depending on the assets, market and the market cycle. In any event, the index and formula should provide a reasonably good forecast of the value of the assets at a point in the future when the adjustment or adjustments are to be made.

As described in Real Estate Embodiment #3, a fund 430 may be created and managed by a fund manager 120 (or a fund management system). The management control is depicted by arrow 422. Shares 432 can be issued against the fund 430. Shares 432 may be offered publicly, e.g., on an exchange 450, offered privately, or not offered at all. That is, the shares 432 need not ever be offered for trade or listed on an exchange. Investors 440 (i.e., I1, I2, In) may purchase, trade and redeem shares via the exchange 450.

In various embodiments RIET 410 could receive shares in the fund, which may later become liquid and/or may begin paying distributions. REIT 410 could receive shares 432, whether marketable or not from the fund manager 420, as indicated by arrow 436. In various embodiments, the fund manager 420 may also obtain shares 432', as indicated by arrow 424. REIT 410 can be allocated shares 432 as some or all of its upfront liquidity, based on the buy-in of the REIT. The concept of buy-in can be similar to that described with respect to FIG. 1. The fund manager shares 432' can also be determined as described with respect to FIG. 1.

Real Estate Embodiment #4

Assume, for example, that an owner of a strip mall has a commercial loan for 80% of the value of the property. In this example, the interest rate is set as 1% above the 10 year treasury rate and the owner initially makes enough rent to cover his debt service and other expenses. The loan is amortized at that rate for 30 years, but the full loan balance is due as a "bullet" in 10 years. The owner is worried that in 10 years, when the loan is due, inflation expectations will be higher, so the 10 year treasury rates will be significantly higher. In the mean time, inflation will not yet have worked its way into the owner's rental revenues. In this case, the owner's debt service will be higher than his revenue and he could face financial peril at the end of the 10 year term.

In accordance with aspects of the present invention, a solution is to obtain liquidity at the close of the original 10-year term using a small business commercial real estate fund, indexed, at least in part, to rental revenues for properties of similar type in the same or a similar area. The owner is a real estate small business and the upfront liquidity is the money provided to the owner by the fund. A payment stream from the owner to the fund is defined and, at least in part, is adjusted as a function of the index. As a result, if the index goes up the owner's payment obligation goes up, but if rents go down then the owner's payment obligation goes down.

Thus, relating the example to FIG. 1, the real estate small business is small business A1, with small businesses A2—An optionally included. Sector "A" is commercial real estate. The fund manager 120 is the bank. The arrows 112 represent the liquidity provided from the fund to the real estate small business. Index 134 is the index that includes at least one component related to, representing, or derived from commercial real estate rental rates, and which are used to adjust at least one payment obligation in the payment stream. The remaining portions of FIG. 1 can be optionally included.

In this example, the term of the small business commercial real estate fund could be for 20 years, protecting the owner for 20 years, or it could be for 10 years, as examples. In the latter case, the owner's actual payment could stay flat (or fixed), regardless of the movement in the index and the fact that the owner's payment obligation continues to be adjusted as a function of the index. In such a case, with flat payments, the owner would end up paying off more of the loan over the 10 years if market rental rates stayed lower, because the index, which is a function of rental rates, would also stay low. Thus, a greater portion of the flat payment could go toward the loan principal or could be banked, e.g., in an interest bearing account. Therefore, when it came time to pay off the fund, the owner could owe less.

At that point in time, with 10 years remaining on the amortization schedule, if interest rates were high and rents were relatively low or stayed about flat, the owner could get a new loan to cover his debt services for the final 10 years and the amount the owner needed to borrow would be lower, since the owner's debt would be lower.

In this example, the entire 30 year period is covered. The first 10 years could be covered by the original loan, having the rate of the 10 year treasury rate plus 1%. and the next 10 or 20 years could be covered by liquidity from a small business commercial real estate fund.

The above fund could be implemented in a wide variety of commercial or personal contexts. The fund could include a single real estate small business or a plurality of real estate small businesses. In addition to at least one real estate small business the fund could include one or more: (1) business that are not small business, but are real estate businesses; (2) business that are not real estate businesses, but are small businesses; (3) businesses that are not real estate business and are not small businesses; or (4) any combination thereof.

The fund could be public or private. Though not required, fund shares could be issued, and the value of those shares would, at least in part, be determined by the payments streams from the small businesses. The real estate could be residential, commercial, or a combination thereof.

The index could be a composite index that includes at least one component related to or otherwise having a bearing on the value of the real estate, along with one or more of a variety of components not related to the real estate. For example, an index for commercial real estate could include a component that relates to (or is derived from) commercial real estate rental rates, along with one or more components related to economic indicators (e.g., GDP, CPI, unemployment rates), interest rates, revenue or earnings of a corresponding small business, or other business in the same industry and/or geographic area and/or in related industries or similar geographic areas. The index could also include any other relevant component or measure, e.g., crime rates, tax rates, or real estate development measures. The same could occur in residential real estate embodiments. There is no inherent limit in this regard.

Payment Stream Example

In one embodiment of a payment stream adjustment, upfront liquidity in the form of cash is provided to a building owner (or purchaser), e.g., to purchase or take out equity from a building. As a result, a payment obligation arises for the building owner; the payment obligation includes a payment stream from the building owner. And the payment stream is adjusted according an index. At least a portion of the index is related to a parameter affecting a value of the building. For example, the building could be a single family home and the index could reflect single-family home prices in the area.

The payment obligation, which may typically include the sum of principal and interest, may be adjusted according to the index. However, such adjustment of the payment obligation may not affect the principal amount due or number of payments due, but rather represents a one-time additional payment or one-time reduction in payment. For instance, suppose that a loan has a fixed interest rate and the component that is used to pay down principal is increased upward as payments are made. For example, if the principal and interest results in a $4,000 monthly payment and the index rises 5%, the payment will be adjusted by 5% to be $4,200, where the additional $200 is not additional principal, but rather an additional one-time charge. In other embodiments, the index may be applied according to another formula. The converse can also occur. For example, if the index goes down 5%, the payment could be reduced by $200. The remaining principal balance is unaffected by the one-time reduction in the monthly payment.

Prepayment

When part or all of a loan is paid off prior to the end of the loan term, the amount of due may be the present value of the future payments, where these payments have been adjusted according to the index. The payment amount used in this present value calculation may be the adjusted amount using the index and the adjustment formula. The payments used may also take into account, for example, the highest index level for X-number of months before the payoff, or use some other formula. If the payment is higher than the otherwise remaining principal, various parties may refer to this as extra principal or extra interest. If the payment is lower than the principal would otherwise have been, various parties may call the reduction reduced principal or reduced interest. Instead of being referred to as interest or principal, various parties may refer to these amounts as fees, rebates or some other legal, accounting or business term. The prepayment interest rate, or the formula with which to calculate it, may be any agreed upon interest rate.

In some embodiments, the loan could be written to have a higher principal than the amount requested, e.g., of the entity/borrower wanted $900K the loan principal could be set at $1 M for purposes of determining the payments—the entity would not actually receive the additional $100 K. The higher principal amount would result in higher payments during the term, since the principal used to calculate the payments would be greater. If the entity decided to payoff early, some or all of the additional amounts could be retained. But if the entity completed the term, then the additional amounts paid due to the larger principal (i.e., the extra $100 K) could be deducted from the balance of the loan as debt forgiveness. Therefore, the entity would effectively pay nothing extra over the full term of the loan by basing the payments on a principal of $1 M rather than $900 K.

In other embodiments, the loan could be written to have a higher interest rate, e.g., 6% instead of 5.5%. This increase would cause the payments to be higher. If the loan were paid-off early, some or all of the additional amounts could be retained. But if the entity completed the term, then the additional amounts paid due to the larger interest rate (i.e., the extra 0.5%) could be deducted from the loan as interest forgiveness. Therefore, the entity would effectively pay nothing extra over the full term of the loan by basing the payments on an interest rate of 6% rather than 5.5%.

Computer Architecture

With respect to the embodiments above, or any other embodiments not shown herein, a market-based liquidity system and method and a common index securities system and method may be embodied in a network of computer devices, which may include wired (e.g. copper, fiber optic), wireless and other communication means. Such computers may include personal computers, servers, workstations, personal digital assistants (PDAs), cell phones, pagers, e-mail devices, and so on. Any of which may process, store, operate on, present, or communicate data and execute system functionality.

Figure 3:
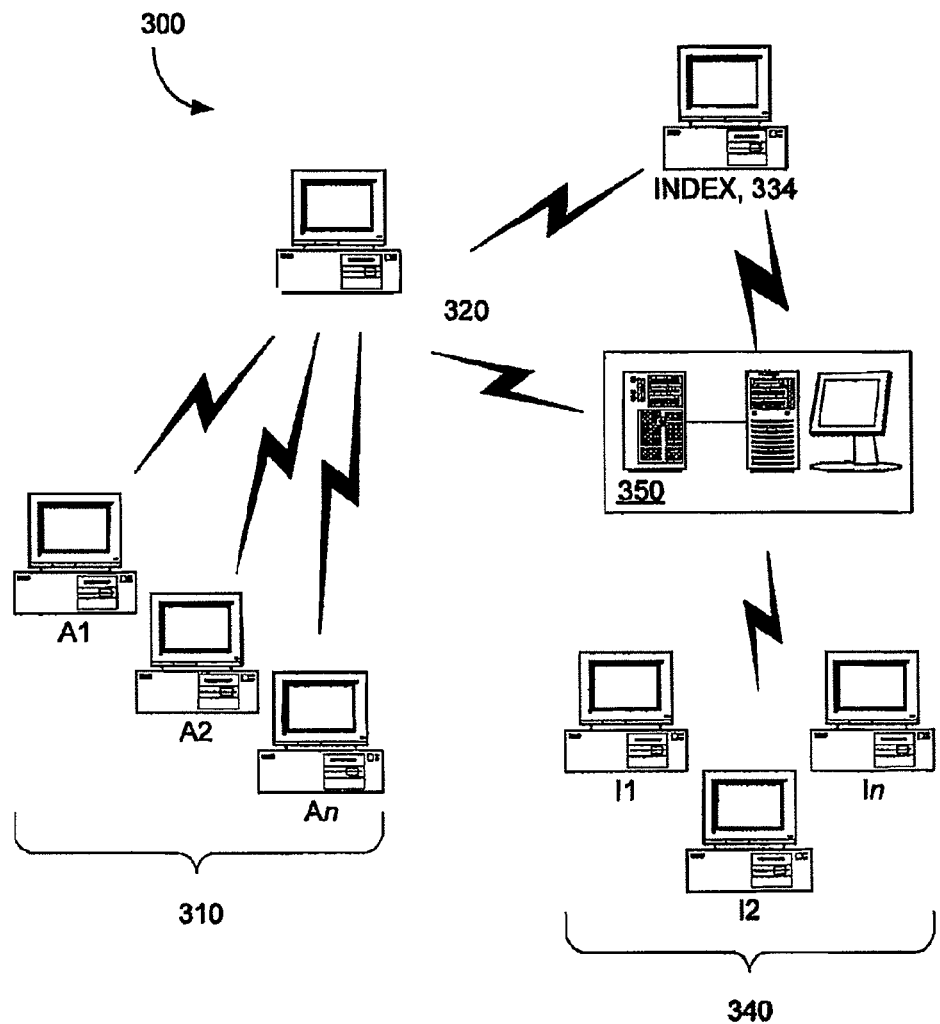
FIG. 3 is a top level embodiment of a computer architecture which could be used to implement the systems of FIG. 1 and FIG. 2.

FIG. 3 provides a set of computing devices 300 including an embodiment of a market-based liquidity system in the form of a common index securities system 320, according to any of the above embodiments or other embodiments not herein disclosed. The common index securities system 320 can provide overall administration of the contracts that formalize the relationships with the small businesses 110, 210 or REIT 410, via the entity management systems 310. One or more entity management systems 310 can be provided for general management of small businesses 110, 210, and one or more REITs 410. Such systems could be used to manage receipt of upfront liquidity and the making of payments from the payment streams to the common index securities system 320. Common index securities system 320 can manage the transfer of upfront liquidity to the entity management systems 310 and the receipt of payment stream payments from the entity management systems 310.

The common index securities system 320 can also include a fund management system, to establish and manage funds 130, 230, 430. In other embodiments the common index securities system could interface with a third party fund management system (not shown). If shares are issued and traded, the common index securities system 320 can communicate with an exchange system 350 configured for offering, trading, and redeeming the shares 132, 232, 432. Investors I1, I2, . . . In, using investor systems 340, can access the exchange 350 for the trading and redeeming of shares. The small businesses 110, 210 or REIT 410 represented in the fund 130, 230 or 430 can also be investors.

The common index securities system 320 can have a link to one or more index systems 334, which serve as the source or sources of index data for the purpose of influencing or adjusting the value of the payments by small businesses 110, 122 or REITs 410.

Functionality of the common index securities system 320 can be embodied in program code executed by one or more processors. The program code and common index securities related data and information may be stored in any known form of computer storage device or system. The common index securities system functionality and data may be co-located or distributed among a plurality of systems or subsystems. Similarly, functionality and data of other relevant entities may be embodied in program code, resident in any of a variety of storage devices or systems and executed or accessed by any of a variety of processors.

In a market-based liquidity embodiment that does not include securitization, system 320 would be a market-based liquidity system, with no need to interface to investor systems 340 or an exchange system 350.

In various embodiments, such as in the systems in FIGS. 1-4, the fund could include one or more securities or assets (e.g., stocks, bonds, shares of other funds, etc.) of a traditional nature and one or more small business assets. For example, an existing fund could make one or more index-related investment as described herein. In such a case, the fund could invest in at least one small business by providing liquidity (or value) to the small business in exchange for a payments stream from the small business that is adjusted based on at least one related index.

In various embodiments, such as in the systems in FIGS. 1-4, the liquidity provided to the small business could be any of a variety of types of value; the liquidity need not be cash. Types of value could include equipment, a license, a lease, a right or bundle of rights. For example, the fund could provide a lease of equipment to a small business, and the small business could make payments under the lease that are tied to an index related to the industry of the small business, the equipment, or both. In other instances, the fund could give (or sell) equipment to the small business, and the small business could make payments to the fund tied to an index related to the industry of the small business, the equipment, or both. In another instance the fund could provide a license (or other right) to a small business in exchange for a payment stream (e.g., license fees or royalties) that are adjusted, at least in part, relative to at least one relevant index.

The payment streams disclosed herein include at least one adjustable payment, and could include one or more fixed payments or one or more payments adjusted based on another index or an interest rate.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method of creating liquidity in one or more assets of one or more borrowers, the method including steps executed by at least one computer processor coupled to at least one non-transitory computer storage medium having stored computer instructions used in performing such steps, the method comprising:

establishing a current market value for at least one asset of a borrower and electronically storing the current market value in the at least one non-transitory computer storage medium;

generating an index having at least one component related to a market to which the at least one asset belongs by the at least one computer processor and electronically storing the index in the at least one non-transitory computer storage medium;

providing an upfront initial payout from a lender to the borrower as a holder of the at least one asset and electronically recording the initial payout in the at least one non-transitory computer storage medium;

defining a payment stream as a repayment obligation by the borrower of the initial payout, using the at least one computer processor, the payment stream having one or more payments from the borrower to the lender;

electronically determining a change in the index, using the at least one processor; and adjusting the payment stream as a function of the change in the index, using the at least one computer processor, wherein changes in the payment stream reflect changes in the market to which the at least one asset belongs.

2. The method of claim 1 wherein the payment stream includes one or more payments having a fixed portion and an adjustable portion.

3. The method of claim 1 wherein the payment stream includes one or more payments having a principal portion and an interest portion used to define a payment amount, and adjusting the payment stream includes adjusting the payment amount by applying an index-based adjustment factor to the payment amount, using the at least one computer processor.

4. The method of claim 1 wherein the index represents values or prices of comparable assets in the same or a comparable market.

5. The method of claim 1 wherein the at least one asset includes real estate assets and the holder is a real estate investment trust (REIT), a fund, a corporate entity or a small business.

6. The method of claim 5 wherein the real assets include at least one commercial real estate property.

7. The method of claim 1 wherein the method further comprises creating a fund representing the at least one asset and defining shares representing claims against the fund, using the at least one computer processor.

8. The method of claim 1 further comprising defining a term and adjusting a final payment in the payment stream at the end of the term, using the at least one computer processor.

9. The method of claim 1 further comprising determining the index by predicting a future market value of the at least one asset using market-based trend data, using the at least one computer processor.

10. The method of claim 9 wherein predicting the future market value includes projecting the current value based on the market-based trend data to at least one point in time, using the at least one computer processor.

11. The method of claim 10 wherein the future market value is established by at least one of:
   i) weighting the current market value using the market-based trend data; and
   ii) weighting the current market value using an economic indicator, using the at least one computer processor.

12. A method for providing liquidity in a small business, the method including steps executed by at least one computer processor coupled to at least one non-transitory computer storage medium having stored computer instructions used in performing such steps, the method comprising:
   defining a fund representing a financial stake in a real estate small business;
   determining an initial payout by the fund to the real estate small business and electronically recording the initial payout in the at least one non-transitory computer storage medium;
   generating at least one index related to real estate by the at least one processor and electronically storing the index in the at least one non-transitory computer storage medium;
   defining a future payment stream to be made by the real estate small business to the fund corresponding to the initial payout, using the at least one computer processor;
   electronically determining a change in the index, using the at least one computer processor; and
   adjusting at least one payment in the future payment stream in response to a change in the index, using the at least one computer processor.

13. The method of claim 12, wherein the real estate is commercial real estate, the real estate small business is an owner of the commercial real estate, and the index is derived, at least in part, from commercial real estate rental rates.

14. The method of claim 13, wherein the commercial real estate rentals rates are determined for a specific geographic area.

15. The method of claim 12, wherein the real estate is residential real estate, the real estate small business is an owner of the residential real estate, and the index is derived, at least in part, from residential real estate property values.

16. The method of claim 15, wherein the residential real estate property values are determined for a specific geographic area.

17. The method of claim 15, wherein the residential real estate property values are determined for a specific type of real estate property.

18. The method of claim 15, wherein the residential real estate property values are determined for a specific size of real estate property.

19. The method of claim 15, wherein the residential real estate property values are determined for a specific class of real estate property.

20. The method of claim 12, wherein the real estate is commercial real estate, the real estate small business is an owner of the commercial real estate, and the index is derived, at least in part, from commercial real estate property values.

21. The method of claim 20, wherein the commercial real estate property values are determined for a specific geographic area.

22. The method of claim 20, wherein the commercial real estate property values are determined for a specific type of real estate property.

23. The method of claim 20, wherein the commercial real estate property values are determined for a specific size of real estate property.

24. The method of claim 20, wherein the commercial real estate property values are determined for a specific class of real estate property.

25. The method of claim 12, wherein the index is a composite index that includes one or more components not related to real estate.

26. The method of claim 12, wherein the index is a composite index that includes multiple components related to real estate.

27. The method of claim 12, wherein the index includes one or more components comprising or derived from earnings of the real estate owner.

28. The method of claim 12, wherein the fund further comprises at least one entity that is not a real estate small business.

29. The method of claim 12, wherein the payment stream includes a set of fixed payments and at least one adjustable payment.

30. The method of claim 12, wherein the payment stream represents a set of payment obligations to be determined at predetermined times during a term of the fund, the method further comprising:
   identifying a set of fixed payments to be made by the small business to the fund at the predetermined times during the term; and
   when a fixed payment and a payment obligation are determined at a predetermined time, determining a difference between the fixed payment and the payment obligation, using the at least one computer processor.

31. The method of claim 30, further comprising, when the fixed payment is greater than the payment obligation, applying the difference to a principal amount owed by the small business to the fund as part of the payment stream, using the at least one computer processor.

32. The method of claim 30, further comprising, when the fixed payment is greater than the payment obligation, banking the difference in an interest bearing account, using the at least one computer processor.

33. The method of claim 30, further comprising, when the fixed payment is less than the payment obligation, adding the difference to a principal amount owed by the small business to the fund as part of the payment stream, using the at least one computer processor.

34. The method of claim 12, wherein the fund is managed by a bank or other lender, or an agent or proxy therefore.

35. A method of determining a payoff of a loan, the method including steps executed by at least one computer processor coupled to at least one non-transitory computer storage medium having stored computer instructions used in performing such steps, the method comprising:
    providing upfront liquidity as an initial payout to at least one small business and electronically recording the initial payout in the at least one non-transitory computer storage medium;
    defining a payment stream to be made by the small business as a repayment obligation of the at least one small business for a term, using the at least one computer processor;
    generating at least one index related to a market value of the at least one small business by the at least one computer processor;
    electronically determining a change in the index, using the at least one processor;
    adjusting at least one payment in the payment stream in response to a change in the index, using the at least one computer processor; and
    in the case of payoff before the end of the term, determining a present value of future payments from the payment stream using the at least one index, using the at least one computer processor.

36. The method of claim 35 wherein determining the present value includes using one or more prior index levels applied to the payment stream and a discount rate to calculate the present value of the future payments that would have otherwise been made, using the at least one computer processor.

37. A method of providing liquidity with prepayment adjustments, the method including steps executed by at least one computer processor coupled to at least one non-transitory computer storage medium having stored computer instructions used in performing such steps, the method comprising:
    providing upfront liquidity to a small business of a payout amount;
    generating at least one index related to a market value of the small business by the at least one computer processor;
    defining a payment stream to be made by the small business for a term, the payment stream calculated for a principal amount that is greater than the payout amount, using the at least one computer processor;
    at the end of the term, determining if the principal has been repaid and if there is still an amount due, forgiving at least a portion of the amount due based on the index, using the at least one computer processor.

38. The method of claim 37 wherein forgiven amount includes forgiven principal.

39. The method of claim 37 wherein forgiven amount includes forgiven interest.

* * * * *